US012679237B2

(12) United States Patent
Wedin

(10) Patent No.: US 12,679,237 B2
(45) Date of Patent: Jul. 14, 2026

(54) USING ONBOARD BATTERY CHARGER AS A TUNED MASS DAMPER CONFIGURED TO REDUCE ROAD NOISE, VIBRATION AND HARSHNESS

(71) Applicant: Polestar Performance AB, Gothenburg (SE)

(72) Inventor: Stefan Wedin, Gothenburg (SE)

(73) Assignee: POLESTAR PERFORMANCE AB, Gothenburg (SE)

( * ) Notice: Subject to any disclaimer, the term of this patent is extended or adjusted under 35 U.S.C. 154(b) by 232 days.

(21) Appl. No.: 18/685,471

(22) PCT Filed: Aug. 23, 2022

(86) PCT No.: PCT/US2022/041254
§ 371 (c)(1),
(2) Date: Feb. 21, 2024

(87) PCT Pub. No.: WO2023/028075
PCT Pub. Date: Mar. 2, 2023

(65) Prior Publication Data
US 2025/0050773 A1     Feb. 13, 2025

Related U.S. Application Data

(60) Provisional application No. 63/236,582, filed on Aug. 24, 2021.

(51) Int. Cl.
*B60L 53/57*     (2019.01)
*B60G 13/18*     (2006.01)
(Continued)

(52) U.S. Cl.
CPC .............. *B60L 53/57* (2019.02); *B60G 13/18* (2013.01); *B60G 17/016* (2013.01); *B60L 50/60* (2019.02);
(Continued)

(58) Field of Classification Search
CPC ......... B60L 53/57; B60L 50/60; B60G 13/18; B60G 17/016; B60G 2206/73; B60G 2300/50; B60G 2400/102; B60G 2500/104
See application file for complete search history.

(56) References Cited

U.S. PATENT DOCUMENTS 11,890,931 B2 *   2/2024   Medina .................. B60G 17/06
2013/0161957 A1 *  6/2013   Bhat ......................... F03G 7/08
                                                        290/55
(Continued)

FOREIGN PATENT DOCUMENTS

CN           116395033 A  *  7/2023   ............. G05D 1/021

OTHER PUBLICATIONS

Application No. PCT/US2022/041254 , International Search Report and Written Opinion, Mailed On Nov. 4, 2022, 8 pages.

*Primary Examiner* — Jacob B Meyer
(74) *Attorney, Agent, or Firm* — Kilpatrick Townsend & Stockton LLP

(57) ABSTRACT
An electric vehicle, including a vehicle structure, four ground engaging wheels, and a suspension system operably coupling each of the four ground engaging wheels with the vehicle structure, a battery operably coupled to the vehicle structure, and an onboard battery charger in electrical communication with the battery, the onboard battery charger operably coupled to the vehicle structure by a battery charger suspension system, the battery charger suspension system including one or more dampers tuned to counteract resonance vibrations experienced by the vehicle structure.

20 Claims, 4 Drawing Sheets

(51) Int. Cl.
*B60G 17/016* (2006.01)
*B60L 50/60* (2019.01)

(52) U.S. Cl.
CPC ...... *B60G 2206/73* (2013.01); *B60G 2300/50* (2013.01); *B60G 2400/102* (2013.01); *B60G 2500/104* (2013.01)

(56) References Cited

U.S. PATENT DOCUMENTS

2014/0081490 A1*  3/2014  Adelman ................ B60L 53/16
                                                          320/109
2018/0148109 A1*  5/2018  Ayukawa ............... B62D 21/11
2019/0366834 A1   12/2019 Nagpal et al.
2021/0146776 A1*  5/2021  Bollinger .............. H01M 10/44
2021/0257896 A1*  8/2021  Haronian .............. H02K 35/02
2025/0050773 A1*  2/2025  Wedin .................... B60L 53/22

* cited by examiner

114

Electronic Control Unit
124

Processor
126

Memory
128

Control Engine
130

Sensing Circ.
132

Power Source
134

Comm. Engine
136

Spectrum Analyser
122

Sensor
120

Electroactive Damper
118

USING ONBOARD BATTERY CHARGER AS A TUNED MASS DAMPER CONFIGURED TO REDUCE ROAD NOISE, VIBRATION AND HARSHNESS

CROSS-REFERENCE TO RELATED APPLICATIONS

The present application is a 371 Application based on PCT/US2022/041254 filed Aug. 23, 2022, and claims the benefit of U.S. Provisional Application No. 63/236,582 filed Aug. 24, 2021, the disclosures of which are hereby incorporated by reference in their entirety.

TECHNICAL FIELD

The present disclosure relates generally to electric vehicles, and more particularly to an electric vehicle having a battery charger coupled to a vehicle structure with a suspension system tuned to counter natural resonance frequencies of the vehicle structure.

BACKGROUND

Today's motor vehicles include sophisticated suspension systems comprising a protective lattice of shock absorbing components, such as springs and dampers, aimed at reducing vibrations. When a vehicle's wheels ride over an irregular road surface, vibrations of various input frequencies are developed. Although today's sophisticated suspension systems serve to absorb much of the vibration, some of the vibration is still transferred to the vehicle structure. Where the transferred vibrations are at or near a natural frequency of the structure, a resonance resulting in increased amplitude in the vibrations within the structure can be observed. Typically the resonance manifests itself to the occupants of the vehicle as an increase in road noise.

Issues with resonance can be particularly prevalent in vehicles without a traditional or fixed, rigid roof bond (e.g., convertibles, vehicles with a glass roof, etc.), as the torsional rigidity of these vehicles is less than a vehicle with a traditional roof. Specifically, the reduced torsional rigidity can become noticeable by the occurrence of trembling vibrations, which can occur when driving over a rough road.

Over the years, various vibration absorbers aimed at reducing vehicle resonance have been developed. These vibration absorbers generally include a relatively heavy absorber mass which is connected with the vehicle structure via rubber bearing elements with hydraulic damping. However, this vibration absorber has the disadvantage that the natural frequency of the vibration absorber must be precisely adapted to the natural frequency of the torsional vibration of the structure. This adaptation requires that values for the rigidities of the absorber bearing be precisely obtained. Another drawback to these vibration absorbers is the necessity to include of a relatively heavy absorber mass, resulting in a heavier, less energy-efficient vehicle.

The present disclosure addresses these concerns.

SUMMARY OF THE DISCLOSURE

Embodiments of the present disclosure provide an onboard battery charger for an electric vehicle operably coupled to a vehicle structure as a mass damper tuned to counter frequencies (e.g., a natural resonance frequency of the vehicle structure) with the goal of reducing road noise, potentially to a point where the road noise is no longer apparent to occupants of the vehicle. Accordingly, the onboard battery charger, which typically weights between about 10-12 kg, can have a dual function of both providing recharge capabilities to a battery pack, as well as counteracting natural vehicle structure resonance frequencies during use.

One embodiment of the present disclosure provides an electric vehicle, including a vehicle structure, four ground engaging wheels, and a suspension system operably coupling each of the four ground engaging wheels with the vehicle structure, a battery operably coupled to the vehicle structure, and an onboard battery charger in electrical communication with the battery, the onboard battery charger operably coupled to the vehicle structure by a battery charger suspension system, the battery charger suspension system including one or more dampers tuned to counteract resonance vibrations experienced by the vehicle structure.

In one embodiment, the electric vehicle includes four dampers tuned to counteract resonance vibrations experienced by the vehicle structure. In one embodiment, the onboard battery charger is coupled to a rear portion of the vehicle structure. In one embodiment, the onboard battery charger is configured to oscillate in an out-of-phase relationship with the vehicle structure. In one embodiment, the one or more dampers include a fixed damped tuned to minimize oscillation displacement experienced by the vehicle structure.

In one embodiment, the vehicle includes sensing circuitry configured to sense oscillations in the vehicle structure. In one embodiment, the sensing circuitry comprises at least one accelerometer and spectrum analyzer. In one embodiment, the one or more dampers are constructed of an electroactive polymer material. In one embodiment, the vehicle includes an electronic control unit configured to adjust a voltage applied to the one or more dampers to adjust a damping of the one or more dampers in real time based on feedback data received from the sensing circuitry. In one embodiment, the electronic control unit actively adjusts the voltage applied to the one or more dampers to minimize oscillation displacement experienced by the vehicle structure.

Another embodiment of the present disclosure provides a tuned battery charger configured to reduce road noise, vibration and harshness in an electric vehicle, including a battery charger in electrical communication with a battery, the onboard battery charger operably coupled to a vehicle structure by a battery charger suspension system, the battery charger suspension system including one or more dampers tuned to counteract resonance vibrations experienced by the vehicle structure.

In one embodiment, the electric vehicle includes four dampers tuned to counteract resonance vibrations experienced by the vehicle structure. In one embodiment, the onboard battery charger is coupled to a rear portion of the vehicle structure. In one embodiment, the onboard battery charger is configured to oscillate in an out-of-phase relationship with the vehicle structure. In one embodiment, the one or more dampers include a fixed damped tuned to minimize oscillation displacement experienced by the vehicle structure.

In one embodiment, the vehicle includes sensing circuitry configured to sense oscillations in the vehicle structure. In one embodiment, the sensing circuitry comprises at least one accelerometer and spectrum analyzer. In one embodiment, the one or more dampers are constructed of an electroactive polymer material. In one embodiment, the vehicle includes an electronic control unit configured to adjust a voltage applied to the one or more dampers to adjust a damping of the one or more dampers in real time based on feedback data received from the sensing circuitry. In one embodiment, the electronic control unit actively adjusts the voltage applied to the one or more dampers to minimize oscillation displacement experienced by the vehicle structure.

Yet another embodiment of the present disclosure provides a dynamically tuned mass damper system configured to reduce noise, vibration and harshness in a vehicle, including a vehicle component having a mass, the vehicle component operably coupled to a vehicle structure by a suspension system, the suspension system including one or more dampers constructed of an electroactive polymer material, and an electronic control unit configured to adjust a voltage applied to the one or more dampers to adjust a damping of the one or more dampers in real time based on feedback data received from sensing circuitry, wherein the electronic control unit actively adjusts the voltage applied to the one or more dampers to minimize oscillation displacement experienced by the vehicle structure.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1:
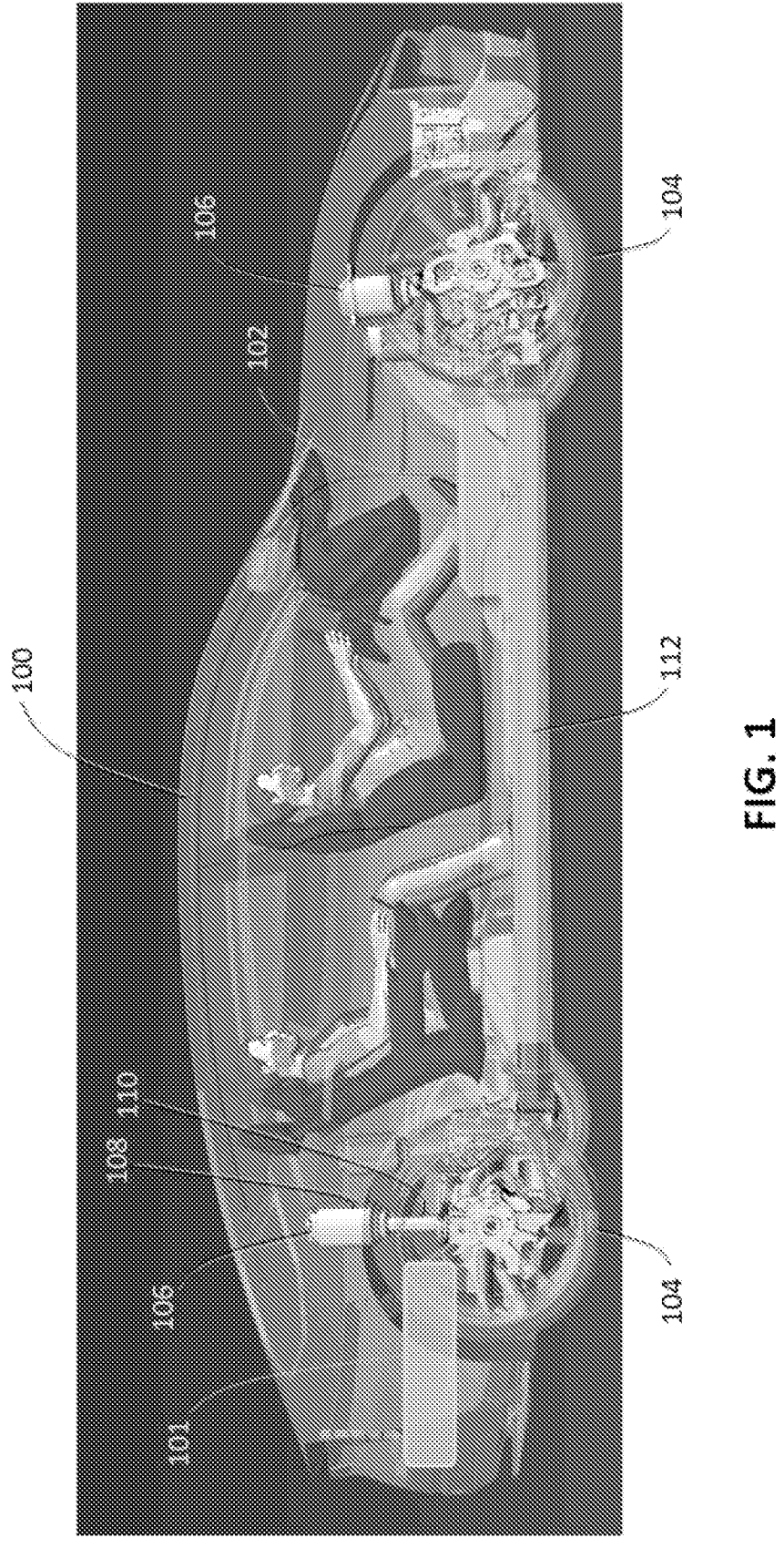
FIG. 1 is an electric vehicle comprising a tuned onboard battery charger configured to reduce resonance in the vehicle, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, an electric vehicle 100 comprising a tuned onboard battery charger 101 configured to reduce resonance in the vehicle, is depicted in accordance with an embodiment of the disclosure. The vehicle 100 can include a vehicle structure 102, wheels 104, a suspension system 106 (e.g., including springs 108 and dampers 110), a battery pack 112. The mass of the vehicle 100 is supported on the vehicle structure 102, whereby the various components of the vehicle 100 form an overall vehicle mass, which for purposes of this disclosure may be considered as separate and independent from the mass of the onboard battery charger 101.

As depicted, the tuned onboard battery charger 101 is mounted in a rear of the vehicle. In other embodiments, the tuned onboard battery charger 101 can be mounted in other locations, including a front of the vehicle, or to a portion of the structure 102 in close proximity to the occupants of the vehicle. Other positions of the onboard battery charger 101 are also contemplated.

Figure 2:
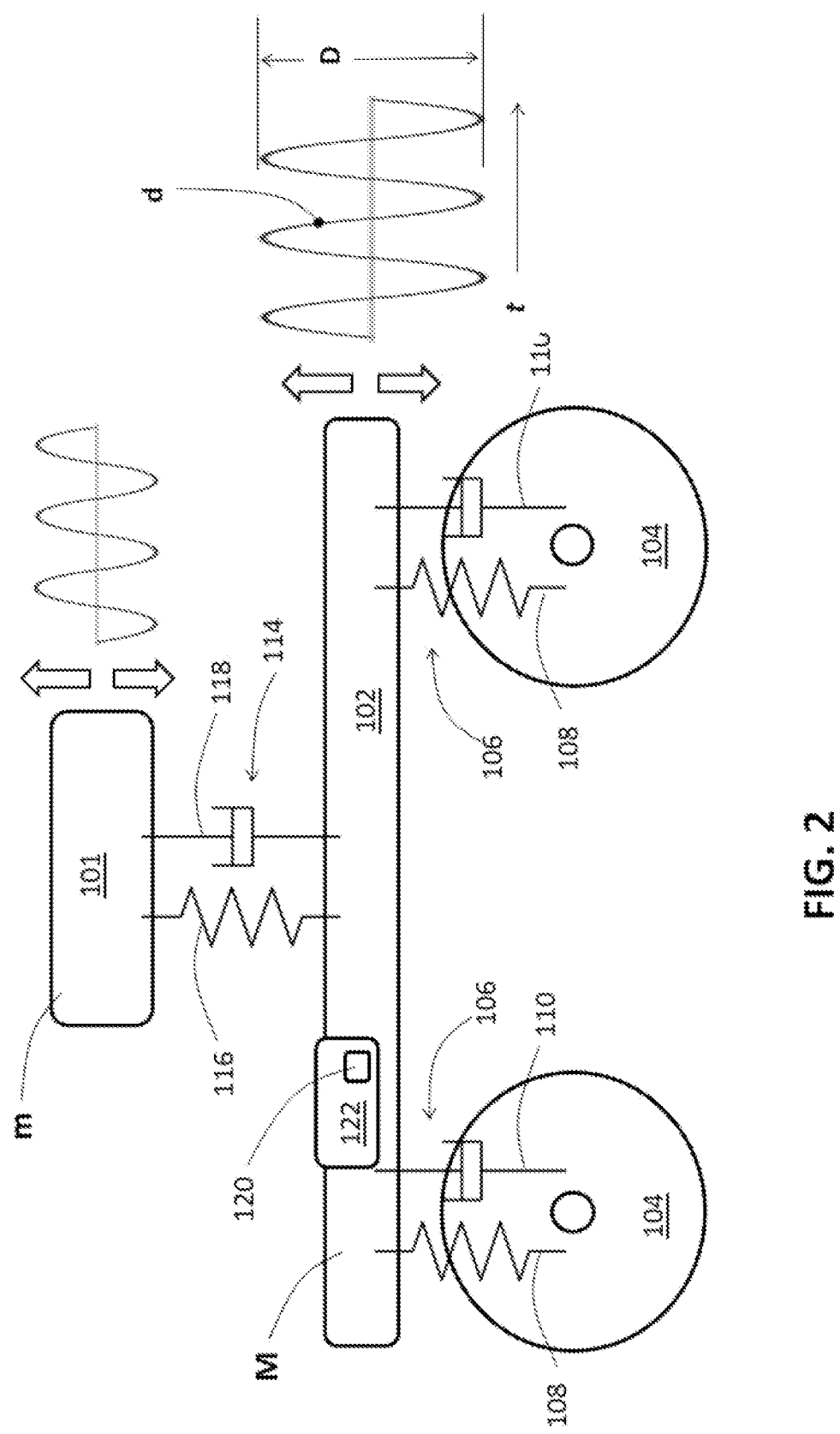
FIG. 2 is a schematic model of an electric vehicle having a tuned onboard battery charger, in accordance with an embodiment of the disclosure.

With additional reference to FIG. 2, a schematic model of a electric vehicle 100 having a tuned onboard battery charger 101, is depicted in accordance with an embodiment of the disclosure. According to the schematic model, the overall mass of the vehicle 100 can be designated "M," while the mass of the onboard battery charger 101 can be designated "m." The vehicle suspension system 106 can include springs 108 (e.g., coil springs, leaf springs etc.) and dampers 110 (e.g., shock absorbers, etc.). The mass "m" of the battery charger 101 can be supported by the vehicle mass "M," via a battery charger suspension system 114. In some embodiments, the battery charger suspension system 114 can include one or more springs 116, one or more dampers 118, or a combination one or more springs 116 and dampers 118.

For simplicity in analysis, the schematic model of the electric vehicle 100 assumes that the irregularities of the road surface provide sinusoidal inputs to the vehicle suspension systems 106, 114. As such, during operation of the electric vehicle 100, irregularities of the road surface cause vertical forces to be transmitted through the vehicle suspension system 106, which in turn causes vertical forces to be transmitted to the battery charger suspension system 114.

Assuming a sinusoidal input, vertical displacement of the vehicle 100 can be plotted, with a distance between the trough and crest designated as displacement "D," with the displacement of the vehicle 100 and any point in time designated as displacement "d." Thus, a relationship of "d" to "D" can be expressed in the equation:

$$d = D \sin \omega t$$

where ω represents the frequency, and/represents the time period for a given waveform. Although the waveform is depicted in FIG. 3 is a sinusoidal wave, other waveforms are also contemplated.

Figure 3:
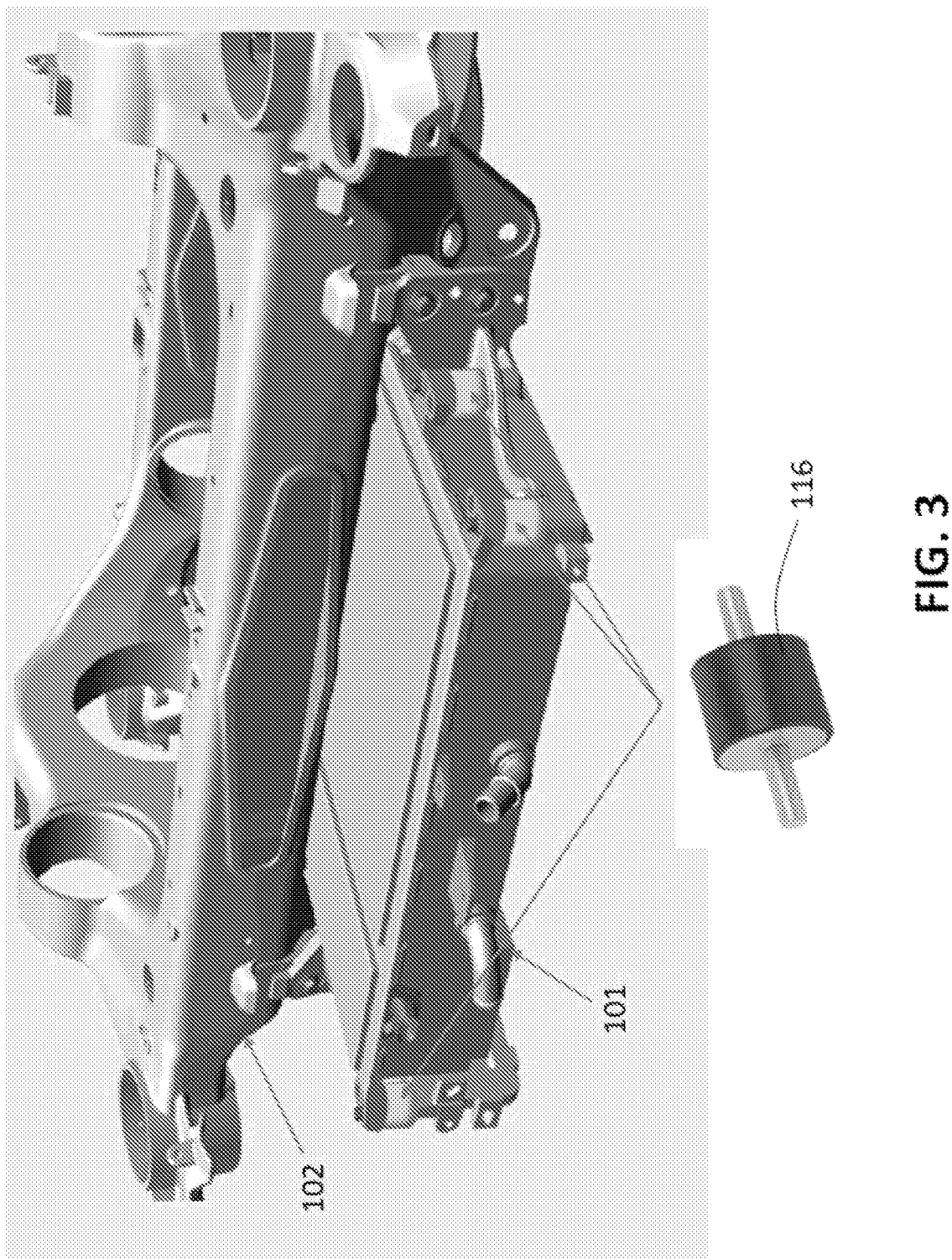
FIG. 3 is a perspective view depicting a tuned onboard battery charger operably coupled to a vehicle structure via a suspension system, in accordance with an embodiment of the disclosure.

With additional reference to FIG. 3, a perspective view depicting a tuned onboard battery charger 101 operably coupled to a vehicle structure 102 via a battery charger suspension system 114 is depicted in accordance with an embodiment of the disclosure. In embodiments, the battery charger suspension system 114 enables the onboard battery charger 101 mass "m" to oscillate in and out of phase relationship with the respective vehicle 100 mass "M." In some embodiments, this phase relationship can be measured via one or more sensors 120 (e.g., accelerometers, etc.) positioned at various locations on the vehicle 100 (e.g., on the onboard battery charger 101, vehicle structure 102, etc.) in combination with a spectrum analyzer 122 (e.g., a fast Fourier transform (FFT) analyzer, or the like).

In an effort to reduce road noise, the battery charger suspension system 114 can be tuned to minimize displacement "D" of the vehicle, such that displacement "D" approaches zero, thereby reducing road noise, potentially to a point where the road noise is no longer apparent to occupants of the vehicle. Various methods of computing the stiffness of the suspension system 114 are contemplated, one method of which is described in U.S. Pat. No. 7,734,384, the contents of which are incorporated by reference, to the extent that they do not conflict with the teachings herein.

In some embodiments, the stiffness of the suspension system 114 (e.g., spring constant, damping, etc.) can be fixed, based on a determined or calculated suspension system stiffness to minimize vehicle displacement "D." In other embodiments, the stiffness of the suspension system 114 can be variable, thereby enabling real-time adjustment of the suspension system 114 to counteract vibrations within the structure 102 over a range of frequencies. For example, in one embodiment, the battery charger suspension system damper 118 can be constructed out of an electroactive polymer material, thereby enabling the damping of the damper 118 to be adjusted.

The term "electroactive polymer" generally refers to polymers whose shape or stiffness can be modified by electric stimulation, among other forms of stimulation. Electroactive polymers can be divided into various classes of material, including ionic polymer metal composites, dielectric elastomers, conducting polymers, polymer gel, polyvinylidene fluoride resins, carbon nanotubes, shape memory polymers, etc.

Figure 4:
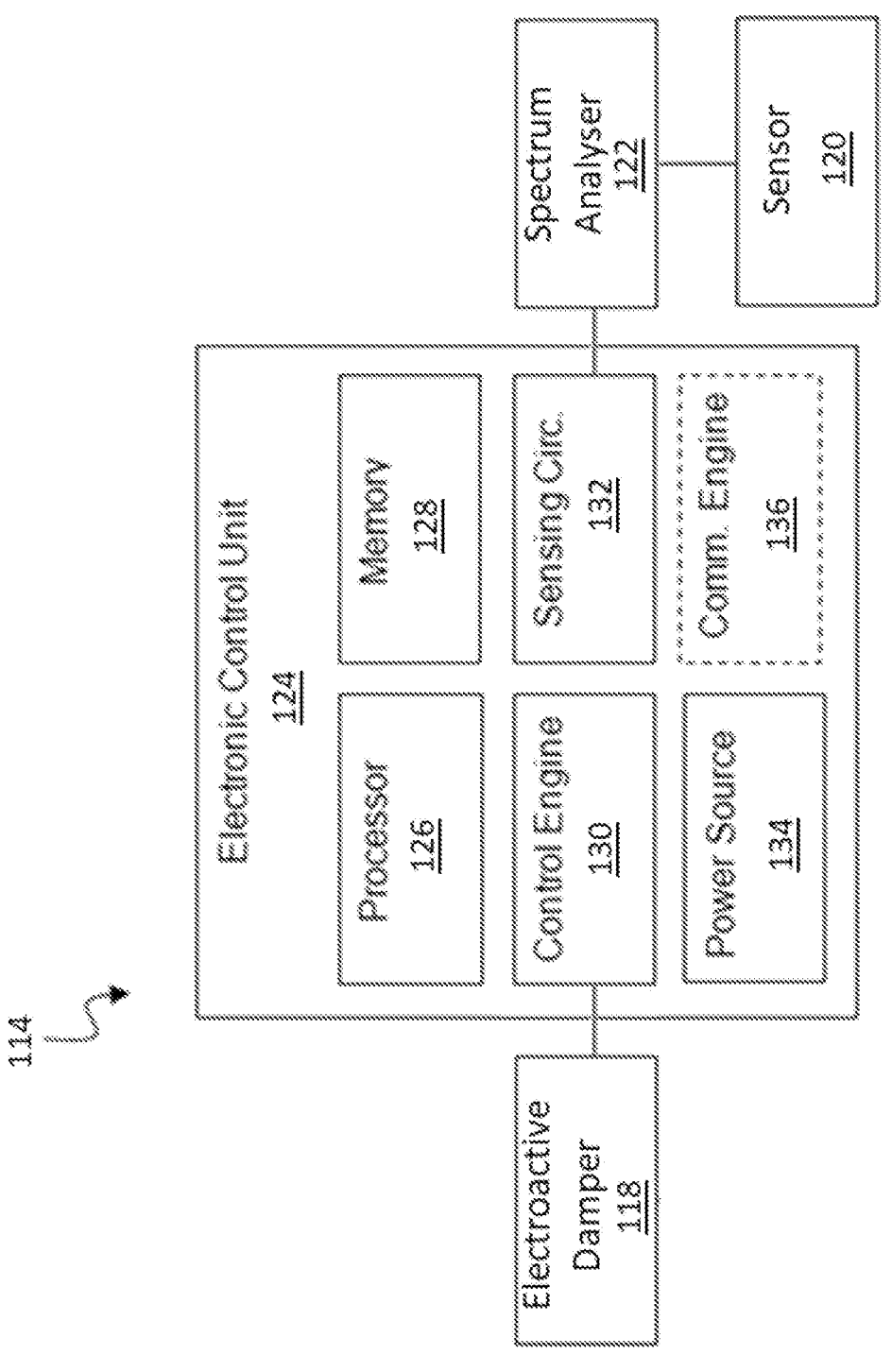
FIG. 4 is a block diagram of a dynamic battery charger suspension system configured for real-time adjustment to counteract vibrations within a vehicle over a range of frequencies, in accordance with an embodiment of the disclosure.

With additional reference to FIG. 4, a block diagram of a dynamic battery charger suspension system 114 configured for real-time adjustment to counteract vibrations within a vehicle over a range of frequencies, is depicted in accordance with an embodiment of the disclosure. In embodiments, the electroactive damper 118 can actuate or otherwise change in shape or stiffness relative to at least one axis. In embodiments, each of the electroactive dampers 118 can be actuated to any degree along its full actuation spectrum by applying the appropriate electrical stimulation. For example, the electroactive damper 118 can be actuated by a fraction of a percent by applying an electric field of between about 20V/μm and about 150 V/μm, whereas larger actuation's (e.g., between about 3% and about 7%) can be affected by applying larger driving voltages.

For improved electrical efficiency, in some embodiments, the electroactive damper 118 can be comprised of a multi-layered electroactive polymer, having a structure in which a plurality of thin polymer layers are laminated on top of each other, with alternatively interposing driving electrodes that have different electrical potentials positioned therebetween. That is, in some embodiments, the multilayered electroactive damper 118 can have a plurality of unit layers, each unit layer including a polymer layer formed of electroactive polymer with an active electrode (e.g., formed of another type of conductive polymer) formed on the polymer layer. Other configurations of the electroactive damper 118 are also contemplated.

In embodiments, the dynamic battery charger suspension system 114 can include an electronic control unit (ECU) 124 to provide electrical stimulation to one or more electroactive dampers 118. In one embodiment, the ECU 124 or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device.

An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques.

Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In some embodiments, ECU 124 can include a processor 126, memory 128, a control engine 130, sensing circuitry 132, and a power source 134. Optionally, in embodiments, ECU 124 can further include a communications engine 132. Processor 126 can include fixed function circuitry and/or programmable processing circuitry. Processor 126 can include any one or more of a microprocessor, a controller, a DSP, an ASIC, an FPGA, or equivalent discrete or analog logic circuitry. In some examples, processor 126 can include multiple components, such as any combination of one or more microprocessors, one or more controllers, one or more DSPs, one or more ASICs, or one or more FPGAs, as well as other discrete or integrated logic circuitry. The functions attributed to processor 126 herein may be embodied as software, firmware, hardware or any combination thereof.

Memory 128 can include computer-readable instructions that, when executed by processor 126 cause ECU 124 to perform various functions. Memory 128 can include volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Control engine 130 can include instructions to control the components of ECU 124 and instructions to selectively control voltage to the electroactive dampers 118. For example, based on conditions detected by sensing circuitry 132 or the vehicle (e.g. other vehicle ECUs), control engine 130 can tune the electroactive dampers 118 to various degrees and stiffness or rigidity.

In embodiments, sensing circuitry 132 can be configured to sense one or more signals related to vehicle vibrations or accelerations. Accordingly, sensing circuitry 132 can include or can be operable with one or more sensors (e.g., one or more accelerometers 120, spectrum analyzer 122, etc.). In embodiments, sensing circuitry 132 can additionally include one or more filters and amplifiers for filtering and amplifying signals received from one or more sensors.

Power source 134 is configured to deliver operating power to the components of ECU 124. Power source 134 can include a battery and a power generation circuit to produce the operating power. In some examples, the battery is rechargeable to allow extended operation. Power source 134 can include any one or more of a plurality of different battery types, such as nickel cadmium batteries and lithium ion batteries.

Optionally, communications engine 136 can include any suitable hardware, firmware, software, or any combination thereof for communicating with other components of the vehicle and/or external devices. Under the control of processor 126, communication engine 136 can receive downlink telemetry from, as well as send uplink telemetry to one or more external devices using an internal or external antenna. In addition, communication engine 136 can facilitate communication with a networked computing device and/or a computer network.

For example, communications engine 136 can receive updates to instructions for control engine 126 from one or more components of the vehicle (other vehicle ECUs) or one or more external devices. In another example, communications engine 136 can transmit data regarding vibrations experienced by the vehicle 100 to one or more components of the vehicle or one or more external devices.

Accordingly, in one embodiment, the suspension system 114 can be configured to monitor vibrations experienced by the vehicle structure 102, for example via the sensing circuitry (e.g., including one or more accelerometers 120). Thereafter, the processor 126 can actively adjust a damping of the damper 118 in real time to minimize displacement "D" of the vehicle, such that displacement "D" approaches zero, thereby reducing road noise, potentially to a point where the road noise is no longer apparent to occupants of the vehicle.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An electric vehicle, comprising:
a vehicle structure, four ground engaging wheels, and a suspension system operably coupling each of the four ground engaging wheels with the vehicle structure;
a battery operably coupled to the vehicle structure; and
an onboard battery charger in electrical communication with the battery, the onboard battery charger operably coupled to the vehicle structure by a battery charger suspension system, the battery charger suspension system including one or more springs tuned to counteract resonance vibrations experienced by the vehicle structure.

2. The electric vehicle of claim 1, comprising four springs tuned to counteract resonance vibrations experienced by the vehicle structure.

3. The electric vehicle of claim 1, wherein the onboard battery charger is coupled to a rear portion of the vehicle structure.

4. The electric vehicle of claim 1, wherein the onboard battery charger is configured to oscillate in an out-of-phase relationship with the vehicle structure.

5. The electric vehicle of claim 1, wherein the one or more springs include a fixed damping tuned to minimize oscillation displacement experienced by the vehicle structure.

6. The electric vehicle of claim 1, further comprising sensing circuitry configured to sense oscillations in the vehicle structure.

7. The electric vehicle of claim 6, wherein the sensing circuitry comprises at least one accelerometer and spectrum analyzer.

8. The electric vehicle of claim 6, wherein the battery charger suspension system comprises one or more dampers, wherein the one or more dampers are constructed of an electroactive polymer material.

9. The electric vehicle of claim 8, further comprising an electronic control unit configured to adjust a voltage applied to the one or more dampers to adjust a damping of the one or more dampers in real time based on feedback data received from the sensing circuitry.

10. The electric vehicle of claim 9, wherein the electronic control unit actively adjusts the voltage applied to the one or more dampers to minimize oscillation displacement experienced by the vehicle structure.

11. A tuned battery charger configured to reduce noise, vibration and harshness in an electric vehicle, the tuned battery charger comprising:
a battery charger in electrical communication with a battery; and
an onboard battery charger operably coupled to a vehicle structure by a battery charger suspension system, the battery charger suspension system including one or more springs tuned to counteract resonance vibrations experienced by the vehicle structure.

12. The tuned battery charger of claim 11, wherein the onboard battery charger is coupled to a rear portion of the vehicle structure.

13. The tuned battery charger of claim 11, wherein the onboard battery charger is configured to oscillate in an out-of-phase relationship with the vehicle structure.

14. The tuned battery charger of claim 11, wherein the one or more springs include a fixed damping tuned to minimize oscillation displacement experienced by the vehicle structure.

15. The tuned battery charger of claim 11, further comprising sensing circuitry configured to sense oscillations in the vehicle structure.

16. The tuned battery charger of claim 15, wherein the sensing circuitry comprises at least one accelerometer and spectrum analyzer.

17. The tuned battery charger of claim 15, wherein the battery charger suspension system comprises one or more dampers, wherein the one or more dampers are constructed of an electroactive polymer material.

18. The tuned battery charger of claim 17, further comprising an electronic control unit configured to adjust a voltage applied to the one or more dampers to adjust a damping of the one or more dampers in real time based on feedback data received from the sensing circuitry.

19. The tuned battery charger of claim 18, wherein the electronic control unit actively adjusts the voltage applied to the one or more dampers to minimize oscillation displacement experienced by the vehicle structure.

20. A dynamically tuned mass damper system configured to reduce noise, vibration and harshness in a vehicle, the system comprising:

a vehicle component having a mass, the vehicle component operably coupled to a vehicle structure by a suspension system, the suspension system including one or more dampers constructed of an electroactive polymer material; and an electronic control unit configured adjust a voltage applied to the one or more dampers to adjust a damping of the one or more dampers in real time based on feedback data received from sensing circuitry, wherein the electronic control unit actively adjusts the voltage applied to the one or more dampers to minimize oscillation displacement experienced by the vehicle structure.

* * * * *